Jan. 28, 1947.   E. A. F. REDMER   2,415,037
WORK FEEDING AND HOLDING APPARATUS
Filed Oct. 4, 1943   2 Sheets-Sheet 1

INVENTOR
Edwin A. F. Redmer
ATTORNEY

Jan. 28, 1947.  E. A. F. REDMER  2,415,037
WORK FEEDING AND HOLDING APPARATUS
Filed Oct. 4, 1943  2 Sheets-Sheet 2
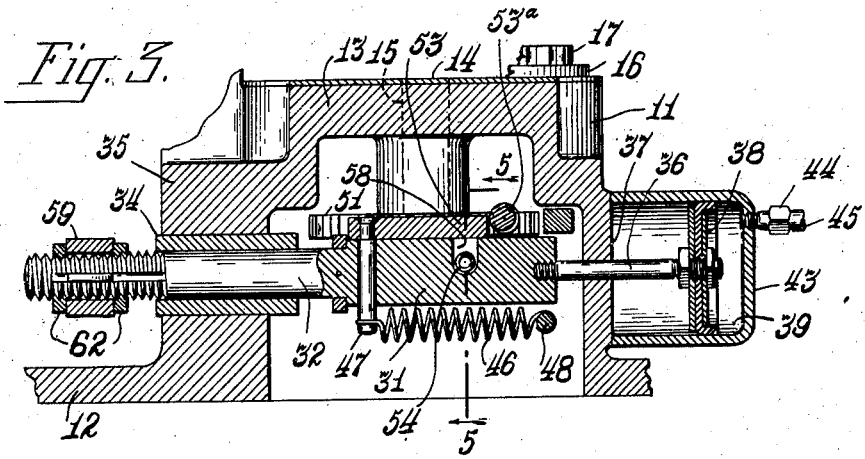
INVENTOR.
Edwin A. F. Redmer
ATTORNEY.

Patented Jan. 28, 1947

2,415,037

UNITED STATES PATENT OFFICE 2,415,037

WORK FEEDING AND HOLDING APPARATUS

Edwin A. F. Redmer, Chicago, Ill.

Application October 4, 1943, Serial No. 504,983

3 Claims. (Cl. 77—64)

The invention relates to small parts feeding mechanism and more particularly to a novelly constructed work feeding and holding apparatus for feeding small articles into position to be acted upon by a tool, or the like, and for accurately positioning and holding said articles firmly during operation of the tool and subsequently effecting their automatic discharge from the apparatus.

Mechanism of the general character of the appartus embodying the features of the present invention include mechanically actuated means operable to convey and successively locate small articles, such as nuts, sleeves, washers etc., in a position to be acted upon by a tool. Such known mechanisms include individual receptacles or holders for the articles, each of such size and shape as to receive and hold an article having a corresponding size and shape thus rendering it necessary to provide a large assortment of feeder and holder elements in order to make the apparatus generally useful. It is therefore, an object of the present invention to provide a feeding and holding apparatus with novel means to adapt such apparatus to the feeding and holding of articles varying, within certain prescribed limits, in size and shape without necessitating any substitution of the work feeding and holding mechanism.

Known mechanisms of this general character also lack means to effect automatic locking or holding of the articles being fed and as a consequence much time and effort frequently is required to effect the needed locking of the articles so as to insure accurate relative positioning between the articles and the tool intended to perform work thereon. Consequently, it is another object of the invention to provide an apparatus of the character referred to with automatically actuated means effective to engage an article just prior to the time it is acted upon by the tool, in such a manner as to insure proper positioning of said article relative to the tool, and which is effective upon completion of the tooling operation, to disengage from said article automatically.

Feeding devices of the known prior types arranged to carry small articles into position to be acted upon by a tool usually require that the articles be manually released from their holders after the tooling operation, and then bodily removed from the holders. It is therefore another object of the present invention to provide a machine of the character with which the invention is concerned with novel means to effect automatic discharge of the articles upon completion of the tooling.

Another object of the invention is to provide a novelly constructed air operated feeding and holding apparatus with novel actuating mechanism capable of repeated operation to effect step by step rotation of the feeding means and intermittent positive actuation of efficient article clamping means in timed sequence to the step by step motion.

Another object is to provide an apparatus of the character referred to which is not expensive to construct, simple, positive and inexpensive to operate, and very efficient in use.

The foregoing and other objects of the invention will be more apparent from the following description and the illustrations in the accompanying drawings which show selected embodiments and the principle thereof and which are considered to be practical modes of construction. Obviously, other structural organizations embodying the same or equivalent principles may be utilized by those skilled in the art without departing from the spirit of the present invention and the scope of the appended claims.

In the drawings:

Fig. 3 is a vertical sectional view through the operating motor, taken on line 3—3 of Fig. 2.

Fig. 4 is an inverted plan view of the apparatus showing parts of the base flange broken away.

Fig. 5 is an enlarged detail sectional view taken on line 5—5 of Fig. 3.

Fig. 6 is an enlarged fragmentary sectional view of the article clamping mechanism, taken on line 6—6 of Fig. 2 and showing an article clamped in place.

Fig. 7 is a horizontal sectional view taken on line 7—7 of Fig. 6, showing the clamp jaw in clamping position.

Figure 1:
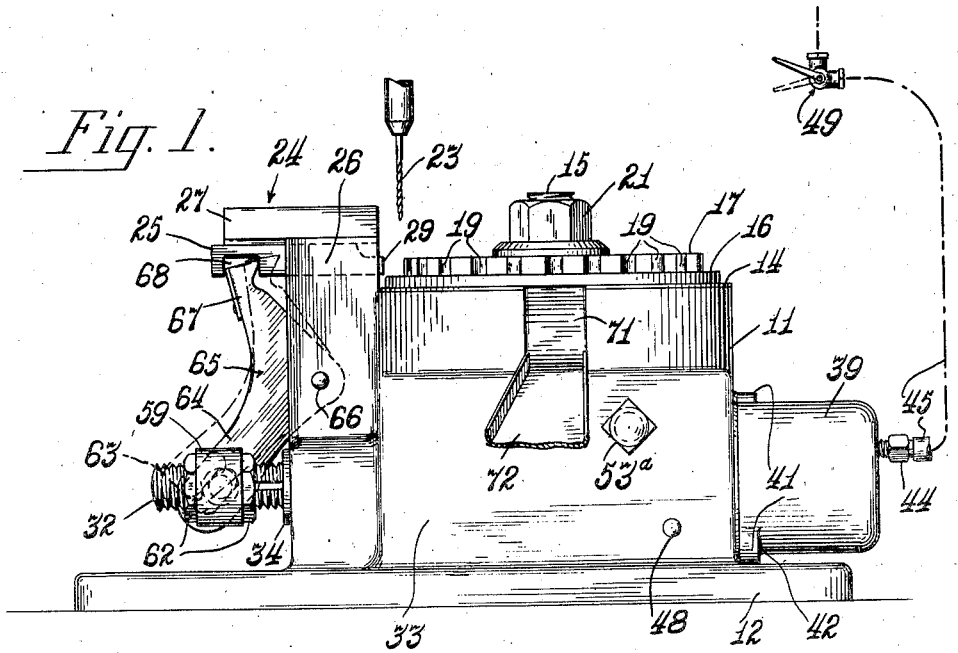
Fig. 1 is a side elevational view of the apparatus showing it mounted in operative relation to a tool.

The feeding and holding apparatus shown in the accompanying drawings includes a casing or housing consisting of a hollow body portion 11 and a base flange 12. This housing preferably is cast with rather thick walls so as to withstand considerable hard usage and protect the operating parts carried thereby, and the body portion 11 is open through its bottom to afford access to mechanism contained therein. The body portion 11 is substantially cylindrical and its top end wall 13 carries a fixed wear plate 14 or bed, provided for a purpose to be understood as the description proceeds. A rotatable axle 15, extending through an axial bore in the body top wall, has a pair of superposed discs 16 and 17, constituting a work feeding mechanism, secured thereon for rotation therewith. The bottom disc 16 is larger than the top disc 17 and is provided with a plurality of circumferentially spaced circular openings 18 in its circumferential margin. The disc 17 has similarly spaced notches or recesses 19 on its periphery. The notches have the same radius as the openings 18 and they register with and provide, in effect, a continuous wall of increased height on the inwardly disposed side of each opening. Both discs 16 and 17 may be easily secured on the axle by means of a nut 21 threaded onto the axle end and it should be obvious that a single member properly shouldered on its circumferential margin and provided with spaced openings therein may be utilized in the place of the multiple disc structure exemplified in the drawings.

The openings 18 in the feeding mechanism provide individual holders each to receive a small article 22. The articles preferably are manually or automatically delivered, one to each opening 18, in the area approximating that indicated at A in Fig. 2. When in place, their bottom ends bear upon the wear plate 14 and they are loosely supported in a substantially upright position by resting against the faces of the respective notches 19 in disc 17. Upon operation of driving means to be described hereinafter, the feeding mechanism is rotated step by step in an anti-clockwise direction to carry the articles therewith over the face of the wear plate 14 and successively locate them in substantial vertical alignment with a tool illustrated as a drill 23, for purposes of description only. In the present exemplification of the invention, the end of the drill 23 is intended to be brought down against the top end of the article to perform a drilling operation. Obviously, accurate drilling cannot be accomplished on a loosely supported article, hence novel means in the form of a clamp mechanism, indicated at 24, is provided on the apparatus.

This mechanism is best shown in detail in Figs. 6 and 7 and it includes a flat, substantially rectangular bar 25 slidably mounted in the forked upper end of a standard 26 preferably cast integral with and on one side of the body portion 11. The bar may be retained in place and guided by a cover plate 27 fastened by screws 28 to the top faces of the forked standard ends. A V-shaped jaw 29 is formed on the end of the bar 25 disposed towards the feeding mechanism 16—17. When the apparatus is in use, the bar 25 reciprocates toward and away from the feeding mechanism while said mechanism is at rest, and as the bottom face of said bar is disposed in a plane slightly above the top face of the bottom disc 16, its forward end, or jaw 29, moves inwardly thereover into tight abutment with whichever article 22 is momentarily located at the tooling station. In this manner, the article 22 is thrust tightly against the high wall portion of the opening 18, as defined by the related notch 19, and it is held in a true vertical alignment with the tool 23. Reciprocable movement of the jaw bar 25 is of course, effected in timed relation to the step by step rotation of the feeding mechanism hence common actuating means is embodied in the present apparatus to actuate both devices.

As best illustrated in Figs. 3 and 4, the common actuating means consists of an air motor including a horizontally reciprocable shaft preferably formed of a length of square stock suitably turned down at one end to define an elongated square portion 31 and a round bearing portion 32. The square shaft portion 31 is wholly contained within an enlargement 33 on one side of the body portion 11 and its round portion 32 slidably extends through a bushing 34 in one end wall 35 of said enlargement. The other end of the square shaft portion 31 is tapped to threadingly receive a piston rod 36 which extends through an opening in the other end wall 37 of said enlargement and carries a piston 38 on its free end. The piston 38 has an operating fit within a cylinder 39 consisting of a cup-shaped shell having external radial lugs 41 at its open end for securement to the outside face of the end wall 37 by screws 42. The closed end 43 of the cylinder 39 carries a nipple 44 for a conduit 45 leading from any suitable source of air under pressure.

The shaft 31—32 is retained normally in the position best illustrated in Fig. 3 by means of a tension spring 46 connected at one end to a pin 47 on said shaft, and at its other end to a pin 48 carried in the body wall. In operation of the feeding mechanism the shaft 31—32 is to be reciprocated horizontally at timed intervals. Consequently, a valve 49 is arranged in the air conduit 45 and it may be manually operated or it may be operatively connected with the mechanism carrying the tool 23 so as to thereby cause the valve to open when the tool is moved towards the work and to close when the tool is raised. In either event, each time the valve 49 is opened there is a surge of air under pressure into the cylinder 39 to move the piston and the shaft 31—32 against the tension of spring 46. As soon as the valve is closed the spring 46 returns the shaft to its initial position.

Referring again to Figs. 2 and 3, it will be observed that the shaft 31—32 is operatively connected with the feeding discs 16—17. As shown, the axle 15 extends downwardly into the interior of the body portion 11 and has a ratchet 51 secured thereon by nut 52. The square shaft portion 31 of the reciprocable shaft carries a pawl 53 which may be pivoted on an extended end of the pin 47 and is arranged to co-act with the teeth of ratchet 51 to effect partial rotation of the axle 15 and feeding mechanism each time the reciprocable shaft 31—32 returns to its normal position under the pull of spring 46. Movement of the shaft 31—32 in the direction of its normal position may be limited by abutment of the end of the pawl 53 with a stop 53a. Yieldable engagement between the pawl 53 and the ratchet teeth is maintained by a pawl spring 54 anchored at one end to a pin 55 on said pawl and at its other end to a cross-pin 56 seated on the end of a tubular fitting 57 threaded or otherwise secured to one side face of the square shaft portion 31. The spring extends through the fitting 57 and lies in a cut-out 58 provided therefor in the top face of the square shaft portion 31.

Figure 2:
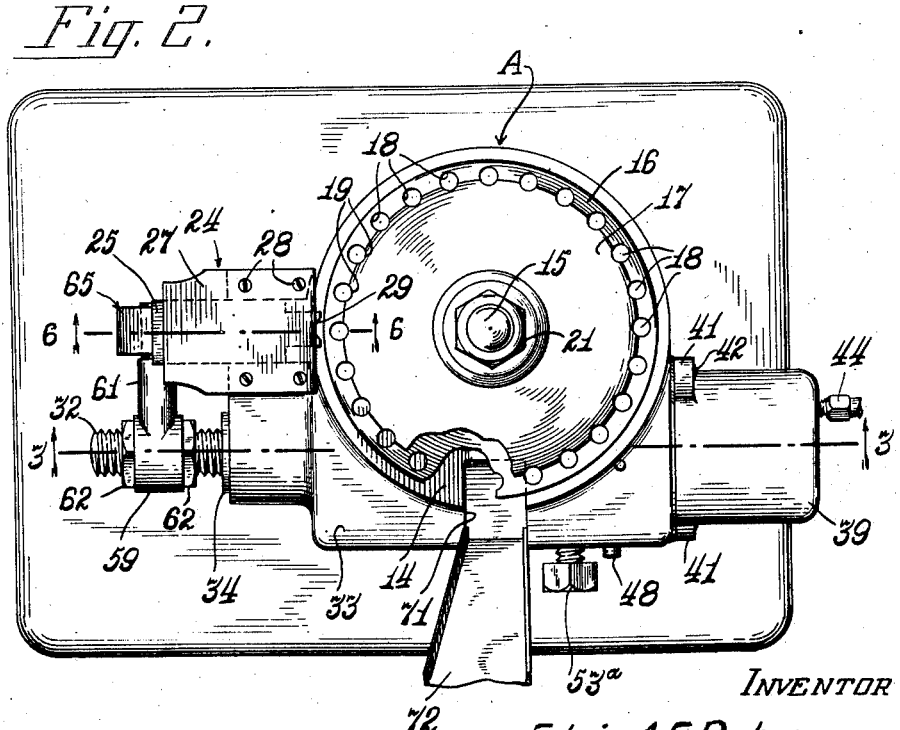
Fig. 2 is a plan view of the apparatus, showing parts of the feeding mechanism broken away.

Continued reciprocable movement of the shaft 31—32 imparts a step by step rotation to the feeding discs 16—17 to successively carry the articles 22 in an anticlockwise direction into substantial alignment with the tool 23. However, as previously noted, the articles must be held firmly at the operating station before they are engaged by the tool. Consequently, the clamp bar 25 is operatively connected also to the shaft 31—32. Referring now to Figs. 1, 2 and 3, which best illustrate this operating connection, the projecting free end of the round shaft portion 32 is threaded and key-slotted to receive an apertured boss 59 on one end of an arm 61. The arm 61 may be adjusted longitudinally along the shaft and it is secured in place by adjusting nuts 62. The free end of the arm 61 extends into a slotted opening 63 in one lever 64 of a bell-crank 65 pivoted at 66 in the standard 26. The other bell-crank lever 67 is suitably shaped at its end to engage in and co-act with the side walls of a transverse channel 68 formed in the bottom face of the overhanging rear end of the clamp bar 25.

Accordingly, when air surges into the cylinder 39, the shaft 31—32 moves in a direction to rock the bell-crank 65 and push the clamp bar 25 inwardly towards and into firm contract with the article carried by the feeding mechanism 16—17 and momentarily at rest below the tool. The valve remains open until the tol 23 has completed its work on said article and has been withdrawn upwardly, whereupon the valve is closed, pressure is relieved, and the spring 46 returns the shaft 31—32 to its initial position to thereby move the clamp jaw outwardly to release the article. As soon as the clamp jaw has moved sufficiently to be out of contact with the article, the pawl 53 engages a tooth on the ratchet 51. Continued movement of the shaft 31—32 rotates the ratchet sufficiently to move the feeding mechanism 16—17 another step to carry the tooled article from beneath the tool and locate a succeeding article therebeneath. In this manner, articles placed in the feeder openings 18 are successively carried into the tool station, held at rest and engaged by the clamp jaw while work is performed thereon and subsequently released and carried away from the tool station. Inadvertent movement of the feeding mechanism while in rest position is prevented by engagement of a dog 69 (Fig. 4) with the ratchet 51.

It should be noted at this time that articles of any size not exceeding the size of the openings 18 in the feeding mechanism may be handled in an efficient manner. In changing from articles of one size to articles of another size it is only necessary to adjust the position of the arm 61 on shaft 31—32 so as to vary the distance to which the clamp bar 25 is moved inwardly towards the article to be clamped.

After an article has been carried away from the tool station, it is removed from the feeding mechanism. In known prior devices of this general character such removal is manually effected. It is therefore another feature of the present invention to provide for the automatic discharge of such articles. To this end, a section of the wall of the housing body portion 11 and a segment of the wear plate 14 are cut away beneath the disc 16, as at 71, so that continuous step by step rotation of the disc 16 successively positions its openings 18 over said cut-away portions and the articles carried therein drop therethrough and are conveyed away from the mechanism by any suitable means such as the chute 72.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. In a work feeding and holding apparatus including a rotatable feeding mechanism and a clamp, holders in said mechanism each adapted to receive an article, means to impart step by step rotation to said mechanism, said means including a ratchet mounted on the axis of said mechanism, a reciprocable shaft adjacent said ratchet, means to move the shaft in one direction only, a bell-crank operatively connected to said clamp, an operating connection between the shaft and said bell-crank effective to rock the bell-crank to move the clamp into a clamping position when the shaft moves in said direction, said operating connection being adjustable so as to permit variation in the distance the clamp is moved upon movement of the shaft, a dog engageable with the ratchet to prevent movement of the feeding mechanism during movement of the shaft in said direction, means to return said shaft to its initial position, and a pawl on said shaft operatively engageable with the ratchet when the shaft moves towards its initial position to rotate the ratchet.

2. In a work feeding and holding apparatus including a rotatable feeding mechanism and a clamp, holders in said mechanism each adapted to receive an article, means to impart step by step rotation to said mechanism, said means including a ratchet operatively connected to said mechanism, a reciprocable shaft adjacent said ratchet, an air actuated motor operable to move the shaft in one direction, an operating connection between said shaft and said clamp effective to actuate the clamp when the shaft moves in the said direction, a dog engageable with the ratchet to prevent movement of the feeding mechanism during movement of the shaft in said direction, spring means to return said shaft to its initial position, and a pawl on said shaft operatively engageable with the ratchet when the shaft moves towards its initial position to rotate the ratchet.

3. In a work feeding and holding apparatus including a rotatable feeding mechanism and a clamp, holders in said mechanism each adapted to receive an article, means to impart step by step rotation to said mechanism to successively position the articles for engagement by the clamp, said means including a ratchet mounted on the axis of said mechanism, a reciprocable shaft adjacent said ratchet, a piston operable to move the shaft in one direction only, an arm adjustably mounted firmly on said shaft, a bell-crank operatively connecting said arm and said clamp effective to move the clamp into clamping position, means to prevent movement of the feeding mechanism during movement of the shaft in said direction, spring means to return said shaft to its initial position, and a pawl on said shaft engageable with the ratchet when the shaft moves towards its initial position to rotate the ratchet.

EDWIN A. F. REDMER.